(12) United States Patent
Bellomi

(10) Patent No.: US 12,515,821 B2
(45) Date of Patent: Jan. 6, 2026

(54) RESERVOIR ASSEMBLY FOR A SPACECRAFT

(71) Applicant: FINIS TERRAE S.R.L., Rome (IT)

(72) Inventor: Paolo Bellomi, Rome (IT)

(73) Assignee: FINIS TERRAE S.R.L., Rome (IT)

(*) Notice: Subject to any disclaimer, the term of this patent is extended or adjusted under 35 U.S.C. 154(b) by 3 days.

(21) Appl. No.: 18/618,809

(22) Filed: Mar. 27, 2024

(65) Prior Publication Data

US 2024/0327039 A1  Oct. 3, 2024

(30) Foreign Application Priority Data

Mar. 28, 2023 (IT) .................... 102023000005910

(51) Int. Cl.
*B64G 1/40* (2006.01)
*F02K 9/50* (2006.01)
*F02K 9/60* (2006.01)

(52) U.S. Cl.
CPC ......... *B64G 1/4021* (2023.08); *B64G 1/4022* (2023.08); *F02K 9/605* (2013.01); *F02K 9/50* (2013.01)

(58) Field of Classification Search
CPC ......... Y10T 137/2937; Y10T 137/3115; Y10T 137/3127; B64G 1/4021; B64G 1/4022; F02K 9/50; F02K 9/605
USPC ........................ 137/156, 206, 209
See application file for complete search history.

(56) References Cited

U.S. PATENT DOCUMENTS

| | | | | | |
|---|---|---|---|---|---|
| 1,568,789 | A | * | 1/1926 | Williams | B67D 1/04 137/340 |
| 2,997,102 | A | * | 8/1961 | Stearns | F02B 1/00 220/325 |
| 3,222,498 | A | * | 12/1965 | Corridan | F22B 37/26 392/394 |
| 3,234,728 | A | * | 2/1966 | Christian | B64D 37/20 222/207 |
| 3,843,024 | A | * | 10/1974 | Barber | B65D 88/62 222/207 |
| 5,240,038 | A | * | 8/1993 | Canedi | B64G 1/4021 137/574 |
| 6,014,987 | A | * | 1/2000 | List | B64D 37/20 137/590 |

(Continued)

FOREIGN PATENT DOCUMENTS

JP    2010132188 A    6/2010

OTHER PUBLICATIONS

Italian Search Report and Written Opinion issued in connection with Italian Patent Application No. 202300005910, dated Sep. 15, 2023, 6 pages.

*Primary Examiner* — William M McCalister
(74) *Attorney, Agent, or Firm* — KLINTWORTH & ROZENBLAT LLP

(57) ABSTRACT

A reservoir assembly for a rocket engine of a spacecraft includes a first reservoir defining a first inner volume, a second reservoir having walls defining a second inner volume and comprising first walls fixed to the first reservoir, and an elastic membrane delimiting the second inner volume from the first inner volume, wherein the second reservoir comprises an outlet to allow a liquid propellant to flow out toward a propulsion apparatus of the rocket engine, characterized in that it further comprises a connecting means coupled to the first and second reservoirs and adapted to connect the first and second reservoirs.

12 Claims, 6 Drawing Sheets

(56) References Cited

U.S. PATENT DOCUMENTS

| | | | | |
|---|---|---|---|---|
| 7,621,291 B2* | 11/2009 | Behruzi | ............... | F17C 13/088 |
| | | | | 137/154 |
| 8,048,211 B2* | 11/2011 | Behruzi | ............... | F17C 13/088 |
| | | | | 55/444 |
| 8,202,357 B2* | 6/2012 | Behruzi | ............... | B64G 1/4021 |
| | | | | 96/219 |
| 2009/0188109 A1* | 7/2009 | Bampton | ............... | F02K 9/605 |
| | | | | 137/264 |
| 2024/0327039 A1* | 10/2024 | Bellomi | ............... | B64G 1/4022 |

* cited by examiner

RESERVOIR ASSEMBLY FOR A SPACECRAFT

CROSS-REFERENCE TO RELATED APPLICATIONS

This patent application claims priority from Italian patent application no. 102023000005910 filed on Mar. 28, 2023, the entire disclosure of which is incorporated herein by reference.

TECHNICAL FIELD

The invention concerns a reservoir assembly for a spacecraft, more specifically a reservoir assembly forming part of a supply apparatus for supplying liquid propellant to a rocket engine.

PRIOR ART

As known, many spacecraft are equipped with a main rocket engine supplied with liquid propellant.

The liquid propellant necessary for the mission is normally stored in one or more reservoirs.

In conditions of micro-acceleration, for example when the spacecraft float in conditions of microgravity with the main rocket engine switched off, the liquid propellant tends to separate from the inner walls of the reservoir and aggregate in a plurality of separate clusters.

If no specific precaution were adopted against this tendency of the liquid propellant, there would be the risk of insufficient liquid propellant at the reservoir outlet port provided for supplying the rocket engine.

This would inevitably affect supply of the rocket engine; in particular, the rocket engine could be accidentally supplied with the gases normally used to pressurize the liquid propellant inside the reservoir, instead of being correctly supplied with the liquid propellant.

Supplying the rocket engine designed to burn liquid with a gas generally compromises operation of the rocket engine.

The need is therefore felt to counter the above-mentioned tendency of the liquid propellant.

According to the known art, some devices or precautions are used for this purpose.

The known devices can be classified essentially in three main categories, namely the categories of surface tension devices, segregation devices and settlement devices with auxiliary motors.

The surface tension devices include interception members for intercepting the liquid propellant, such as knives, sponges, wires, grilles and the like, which are arranged inside the reservoir and have at least one end in the area of the reservoir outlet port.

The interception members are configured to capture the liquid propellant floating in the reservoir and transfer the captured liquid propellant to the end located at the outlet port as a result of the surface tension of the liquid propellant.

Although widely used, surface tension devices have some drawbacks, including for example significant weight and overall dimensions, limitations on the attitude control strategies of the spacecraft, in addition to acceleration in the catalytic decomposition processes for unstable liquid propellants due to interaction with the interception members, etc.

Segregation devices include flexible membranes to delimit the space inside the reservoir into two separate volumes filled respectively with the liquid propellant and the pressurization gas to pressurize the liquid propellant. The volume containing the liquid propellant always communicates with the reservoir outlet port, while the other volume is isolated from the outlet port. The pressurization gas compresses the membranes, so that the capacity of the volume communicating with the outlet port adapts to the quantity of liquid propellant present.

Segregation devices also have some drawbacks. In particular, the volume containing the liquid propellant is designed to decrease significantly between the beginning and the end of the mission, and therefore the membranes must be sizeable and subject to large deformations. This means that a significant quantity of liquid propellant cannot be used because it is trapped between the membranes.

Furthermore, the shape of the reservoirs necessarily has to be simple and regular.

In addition, the membranes are subject to significant forces, including inertial and dynamic forces, hence the design thereof becomes complex, particularly on very large reservoirs where segregation devices are practically inapplicable for this reason.

Moreover, the separation between liquid propellant and pressurized gas cannot be typically guaranteed during filling of the volumes for low-boiling propellants or propellants with high spontaneous decomposition rate.

FIG. 1 illustrates an example according to the known art, in which a reservoir 100 includes an outer shell 101 and an elastic bladder 102 arranged inside the shell 101.

The reservoir 100 includes an outlet 103 for the liquid propellant, such that the liquid propellant can be delivered from the shell 101. For example, the elastic bladder 102 is made of a material comprising polytetrafluoroethylene, otherwise known by the trade name Teflon.

The bladder 102 divides the inside of the shell 101 into an inner volume and an outer volume with respect to the bladder 102. The inner volume is suitable for receiving the liquid propellant and communicates with the outlet 103 by means of a diffuser pipe 105 extending into the inner volume.

The outer volume is isolated from the outlet port 103 and is suitable to contain the pressurizing gas. The inner volume and the outer volume are isolated from each other by means of the bladder 102.

The shell 101 comprises an inlet 104 for the pressurizing gas; the inlet 104 communicates with the outer volume, so that the latter can receive the pressurizing gas.

Devices with auxiliary propulsion, on the other hand, exploit a dedicated propulsion apparatus to accelerate the liquid propellant towards the reservoir outlet port.

Clearly, the provision of a dedicated propulsion apparatus constitutes in itself a drawback due to the presence of said apparatus which would otherwise not be necessary. Furthermore, said apparatus generally has a limited propulsion efficiency (for example low specific impulse) resulting in a further drop in efficiency of the spacecraft and reduction of the payload.

In the light of the above, the need is felt to limit or overcome the drawbacks of the known devices, preferably in a simple dependable manner.

One object of the invention is to meet at least the latter need.

DESCRIPTION OF THE INVENTION

The object is achieved by a reservoir assembly as defined in claim 1.

The dependent claims illustrate particular embodiments of the invention.

BRIEF DESCRIPTION OF THE DRAWINGS

Below, an embodiment of the invention is described for a better understanding thereof by way of non-limiting example and with reference to the attached drawings in which.

EMBODIMENTS OF THE INVENTION

Figure 1:
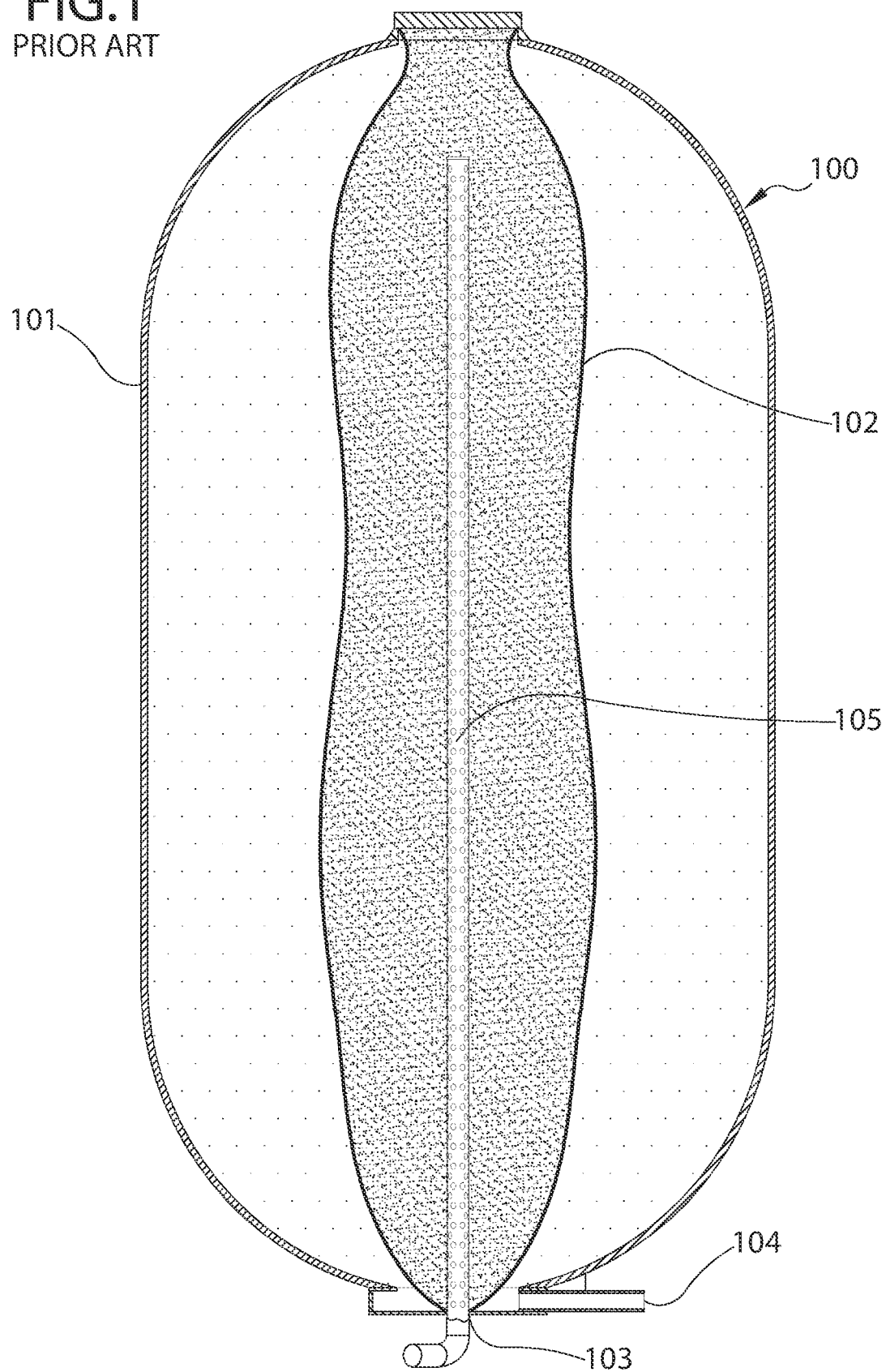
FIG. 1 is a section view of a reservoir for a rocket engine according to the known art.
Figure 2:
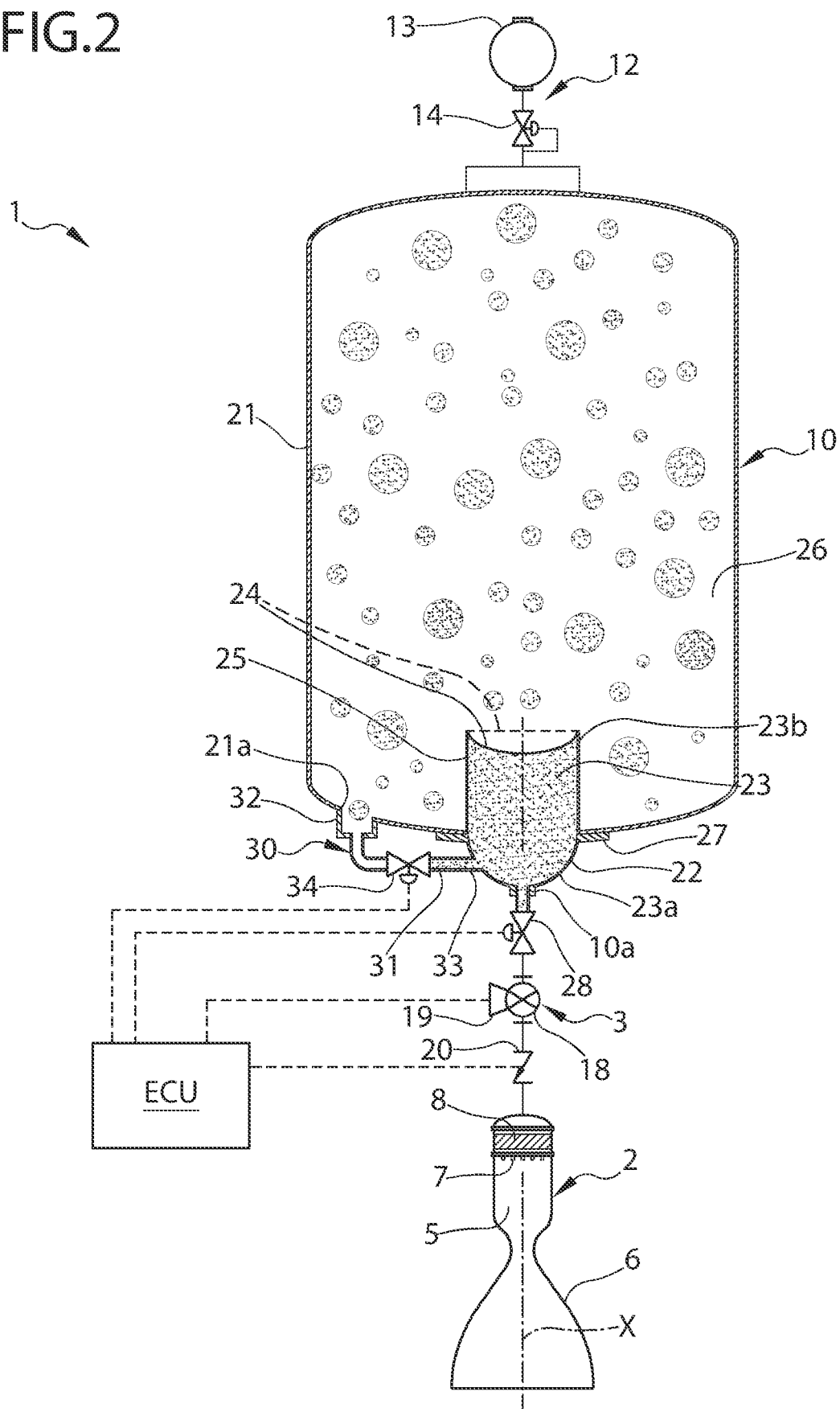
FIG. 2 is a diagram of a rocket engine comprising a reservoir assembly according to the invention.

In FIG. 2, the reference number 1 is used to indicate overall a spacecraft.

FIG. 2 illustrates schematically and substantially in block form a rocket engine of the spacecraft 1, in turn comprising a propulsion apparatus 2 and a supply apparatus 3 to supply a liquid propellant to the propulsion apparatus 2.

Here and below, the term liquid propellant can be understood as a propellant in the liquid state or also in a gel state.

The propulsion apparatus 2 is not limited to a mono-propellant type, but could be indifferently mono-propellant or multi-propellant, without any loss of generality.

According to the specific embodiment illustrated by way of non-limiting example, the propulsion apparatus 2 comprises a combustion chamber 5 and a discharge nozzle 6, for example of convergent-divergent type.

The discharge nozzle 6 is configured to generate a propulsion thrust when crossed by a gas flow generated inside the combustion chamber 5.

The discharge nozzle 6 extends lengthways in a direction X, for example rectilinear, defining in particular the axis of the discharge nozzle 6.

Figure 3:
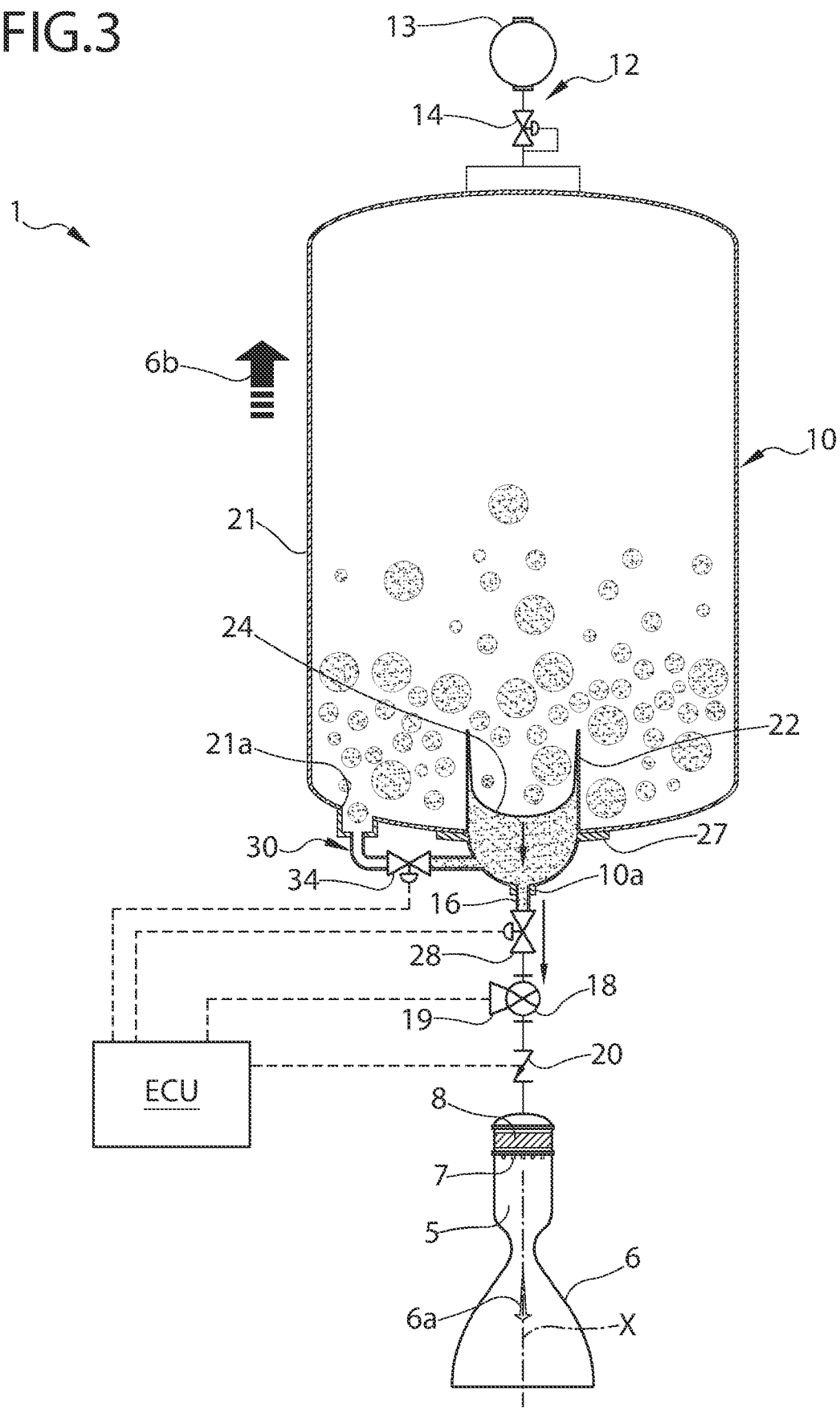
FIGS. 3 and 4 are analogous to FIG. 2 and illustrate the rocket engine in respective distinct operating conditions with respect to that of FIG. 2.

The gas flow, shown in FIG. 3 by means of an arrow 6a, passes through or expands through the discharge nozzle 6 in the direction X.

The propulsion thrust, shown in FIG. 3 by means of an arrow 6b, is directed in the direction X opposite to the direction of the gas flow.

Inside the combustion chamber 5, the propulsion apparatus 2 can comprise one or more injector nozzles 7 and, for example, a catalyst block 8 both known per se.

The supply apparatus 3 comprises a reservoir assembly 10 to store the liquid propellant.

Furthermore, the supply apparatus 3 can comprise a pressurization device 12 configured to pressurize the liquid propellant stored.

For example, the pressurization device 12 comprises a reservoir 13 to contain a pressurizing gas and a pressure regulator 14 configured to regulate emission of the pressurizing gas from the reservoir 13.

According to plausible embodiments not illustrated, the pressurizing gas could be loaded in the reservoir assembly 10 without the pressurization device 12, as occurs for example in blowdown systems.

The reservoir assembly 10 comprises at least one first reservoir or primary reservoir 21, in particular to contain the liquid propellant and the pressurizing gas.

In FIG. 2, the reservoir 21 is filled, in general partially, with the liquid propellant. The reservoir can have any shape and optionally can be divided into a plurality of different volumes fluidically connected.

Furthermore, the reservoir 21 is connected to the pressurization device 12 to receive the pressurizing gas; in particular, the pressure regulator 14 is interposed between the reservoir 13 and the reservoir 21, so that the pressure regulator 14 regulates introduction of the pressurizing gas into the reservoir 21.

Therefore, the pressurization device 12 is configured to pressurize the reservoir 21 by introducing the pressurizing gas inside it, in particular in a controlled manner.

The pressurization device 12 is optional and could therefore be absent; in fact, the reservoir 21 can be self-pressurizing, for example when it contains a liquid propellant having a vapour pressure greater than the pressure required by the propulsion apparatus 2. In this case, the pressurizing gas forms directly inside the reservoir 21.

The reservoir assembly 10 also comprises a second reservoir or secondary reservoir 22.

The secondary reservoir 22 has a plurality of walls, which delimit or define an inner volume 23. In particular, the walls of the reservoir 22 comprise a cap 23a; more in particular, the walls of the reservoir 22 comprise a wall 23b arranged so as to form a cylinder and extending in this specific case axially from the cap 23, more precisely along the axis X.

Furthermore, the walls of the reservoir 22 comprise at least one flexible wall or membrane 24 and one or more walls 25 fixed with respect to the reservoir 21 or more precisely fixed thereto.

In particular, the walls 25 form part of the wall 23b. Furthermore, regardless of this, the membrane 24 is preferably opposite the cap 23a, in particular according to the axis X. Specifically, the membrane 24 closes the cylinder formed by the wall 23b on the opposite side of the cap 23a.

In addition to being flexible, the membrane 24 is also elastic, namely it has an elastic behaviour under stress. Optionally, the membrane 24 can comprise elastic reinforcements, for example springs, configured to increase the overall rigidity thereof.

Furthermore, the membrane 24 is preferably impermeable.

The walls 25 could be integrated in or integral with the reservoir 21, for example so as to form a single body with it.

In the embodiment illustrated, the walls 25 are fixed to the reservoir 21 by means of a connecting flange 27. In particular, the walls 25 are fixed in a fluid-tight manner at the flange 27, for example by means of seals of known type and not illustrated.

The membrane 24 is arranged so as to divide or delimit the inner volume 23 from an inner volume 26 of the reservoir 21 or defined by the reservoir 21. Therefore, the membrane 24 defines a boundary or a portion of boundary between the inner volumes 23, 26.

The shape of the inner volume 26 specifically illustrated is not limiting and could therefore be very different; in this sense, also the term reservoir can be understood in a broad manner, namely as a set of interconnected walls having generic forms and delimiting an inner volume.

In further detail, the membrane 24 has a surface directly facing the inner volume 23 and an opposite surface directly facing the inner volume 26.

Therefore, the membrane 24 is arranged so as to be directly exposed or in any case subject, also indirectly, to the pressure of the pressurizing gas in the reservoir 21, in particular introduced by means of the pressure regulator 14.

Alternatively or additionally, the reservoir assembly 10 can comprise a pressurization device, for example a servo-actuator not illustrated, controllable to exert a pressure on the membrane 24 towards the inner volume 23 in a dedicated manner.

Optionally, the reservoir assembly 10 comprises a protective structure not illustrated or is itself configured to prevent the liquid propellant in the reservoir 21 directly wetting the membrane 24, while allowing the pressurizing gas to exert pressure on the membrane 24.

In practice, the membrane 24 can extend towards the inner volume 23, thus restricting the inner volume 23, due to the pressurizing gas contained in the reservoir 21.

The membrane 24 can assume a plurality of positions, including a rest position corresponding to a condition in which the membrane 24 is free from stresses.

In the rest position, the capacity of the inner volume 23 is conveniently lower than the capacity of the inner volume 26.

More generally, the capacity of the inner volume 23 is conveniently always lower than the capacity of the volume 26, namely regardless of the position or state of deformation of the membrane 24.

The reservoir 22 is suitable to contain the liquid propellant. In FIG. 2, the reservoir 22 is filled, in particular completely, namely for the entire capacity of the inner volume 23.

According to the invention, the reservoir assembly 10 comprises a connecting member or means 30 coupled to the reservoirs 21, 22 and adapted to connect (hydraulically) the reservoirs 21, 22 or more precisely their respective inner volumes 26, 23.

The connecting member 30 comprises a pipe or duct 31 having two opposite ends 32, 33 connected to the reservoirs 21, 22 respectively.

In further detail, each of the ends 32, 33 independently communicates with the corresponding inner volume 26, 23.

The connecting member 30 connects, in particular selectively, the reservoirs 21, 22 or more precisely the inner volumes 26, 23 thereof.

The connecting member 30 preferably comprises a valve device 34 coupled to the duct 31 and controllable to regulate a fluid flow, specifically a liquid propellant flow, from the reservoir 21 to the reservoir 22.

The valve device 34 can selectively admit the fluid flow or block the fluid flow between the reservoirs 21, 22.

The valve device 34 is arranged inside the duct 31 between the ends 32, 33.

To supply the propulsion apparatus 2, the reservoir 22 comprises an outlet port 10a to allow the liquid propellant to flow out towards the propulsion apparatus 2. The outlet port 10a has an orifice, in turn having an outlet axis along which the liquid propellant is destined to flow out of the reservoir 22 towards the propulsion apparatus 2.

The outlet port 10a is located at one end of the reservoir 22, in particular such that the liquid propellant contained therein flows towards said end in reaction to the thrust 6b. In other words, the end of the reservoir 22 is the one ideally incident to the direction of the thrust 6b or with a direction parallel to the axis X and at the same time located on the opposite side with respect to where the thrust 6b is directed or points towards. Specifically, the outlet port 10a is obtained on the cap 23a.

The membrane 24 defines an end of the reservoir 22 which, according to the orifice outlet axis of the outlet port 10a, is opposite the end where the outlet port 10a is located.

Similarly, the end 32 of the duct 31 coincides or communicates, in particular directly, with an orifice 21a of the reservoir 21. The orifice 21a is suitable to allow the liquid propellant contained in the reservoir 21 to flow out towards the reservoir 22.

The orifice 21a of the reservoir 21 has a corresponding outlet axis along which the liquid propellant is destined to flow out from the reservoir 21 towards the reservoir 22.

The orifice 21a of the reservoir 21 is located at one end of the reservoir 21 such that the liquid propellant contained therein flows towards the latter end in reaction to the thrust 6b. In other words, the end of the reservoir 21 is the one ideally incident to the direction of the thrust 6b and at the same time located on the opposite side with respect to where the thrust 6b is directed or points towards.

In further detail, regardless of the schematic representation offered by the drawings (provided only by way of non-limiting example), it is preferable for the orifice 21a to be located at the most extreme point of the reservoir 21 in the direction opposite that of the thrust 6b, such that the reservoir 21 extends from the orifice 21a in the direction of the thrust 6b (namely, there are no portions of the reservoir 21 on the opposite side).

With reference to FIG. 3, the reservoir assembly 10 comprises a duct or pipe 16, which extends from the outlet port 10a to convey the liquid propellant from the reservoir 22 towards the propulsion apparatus 2.

The pipe 16 has an end connected to the outlet port 10a; the end communicates with the orifice of the outlet port 10a.

In further detail, the pipe 16 is arranged so as to connect, in particular selectively, the outlet port 10a and the propulsion apparatus 2.

The reservoir assembly 10 comprises a valve device 28 coupled to the pipe 16 and controllable to regulate a fluid flow, specifically a liquid propellant flow, from the reservoir 22 towards the propulsion apparatus 2.

Like the valve device 34, the valve device 28 can selectively admit the fluid flow or block the fluid flow between the reservoir 22 and the propulsion apparatus 2.

Optionally, the supply apparatus 3 further comprises a metering pump 18 along the pipe 16, specifically downstream of the valve device 28.

Furthermore, optionally, the supply apparatus 3 comprises a motor 19, for example of electric or pneumatic type, configured to operate the metering pump 18.

The metering pump 18 could for example be a pump of known type suitable for use in space applications.

Preferably, the supply apparatus 3 comprises a check valve 20 downstream of the metering pump 18 to prevent the return of the liquid propellant towards the reservoir assembly 10.

Again with reference to FIG. 2, the supply apparatus 3 comprises a control unit ECU configured to control the motor 19, where provided, and consequently the metering pump 18, where provided, thus regulating the liquid propellant flow towards the combustion chamber 5.

Also the reservoir assembly 10 comprises a control unit which, in this case, coincides with the control ECU, although this is not essential.

Below, therefore, the control unit ECU will also form part of the reservoir assembly 10.

In said regard, it is well to clarify that the control unit ECU could be any avionic device suitable for performing the functions described below; for example, the control unit ECU could include or be integrated in an on-board computer.

The control unit ECU is configured to control each of the valve devices 28, 34.

The control unit ECU can, if necessary, control in an independent or coordinated manner the valve devices 28, 34 to regulate respectively the fluid flow between the reservoirs 21, 22 and the fluid flow from the reservoir 22 towards the propulsion apparatus 2.

In particular, the control unit ECU is configured to keep the valve device 34 closed, namely to prevent any fluid flow between the reservoirs 21, 22 when the spacecraft 1 is in a state or condition of micro-acceleration, namely when the acceleration of the centre of gravity of the vehicle 1 is lower than or equal to a micro-acceleration threshold attributed to the state or condition of micro-acceleration.

More precisely, the state of micro-acceleration exists when the accelerations acting on the reservoir assembly 10 are insufficient to induce the formation of a free surface of the liquid propellant at the end comprising the orifice 21a.

The control unit ECU can determine the state of micro-acceleration of the spacecraft 1 according to known methods, for example even by the acquisition of measurements indicative of the acceleration of the vehicle 1 or the reservoir assembly 10.

To start the propulsion apparatus 2, namely to start more precisely combustion of the liquid propellant in the combustion chamber 5, in or during the above-mentioned state of micro-acceleration, the control unit ECU is configured to open the valve device 28, namely to admit the fluid flow from the reservoir 22 towards the propulsion apparatus 2, keeping the valve device 34 closed, until the control unit ECU determines a state of free surface formation of the reservoir assembly, in which the liquid propellant contained in the reservoir 21 collects in the reservoir 21 itself, in particular at the end 32, forming a free surface.

In other words, the control unit ECU is configured to close the valve device 34, namely to prevent the fluid flow from the reservoir 21 to the reservoir 22, if the state of free surface formation is not determined.

The control unit ECU can for example determine the state of free surface formation from signals received from appropriate level sensors coupled to the reservoir 21, or based on a fluid-dynamic modelling of the liquid propellant as a function of the thrust 6b, or even only more simply and by assumption at the expiry of a predetermined time from the beginning of opening of the valve device 28, in particular programmed during mission planning as a function of filling of the reservoir and the state of micro-acceleration.

Furthermore, the control unit ECU can have the purpose of starting the propulsion apparatus 2 in response to a command received, for example upon the request or instructions of a pilot or based on a mission program.

For the purpose of clarity, the pilot is not necessarily a human user, but could also be virtual, namely a computer or an artificial intelligence logic, for example.

When the control unit ECU determines the state of free surface formation, in particular with the propulsion apparatus 2 operating, the control unit ECU is configured to open the valve device 34, namely to admit the fluid flow from the reservoir 21 to the reservoir 22, in particular together with the valve device 28.

When the propulsion apparatus 2 has to be switched off, for example based on the mission program or upon the request of the pilot, the control unit ECU is configured to close the valve device 28, namely to interrupt the fluid flow towards the propulsion apparatus 2.

In the latter situation, the control unit ECU is also configured to close the valve device 34, namely to interrupt the fluid flow towards the reservoir 21.

The control unit ECU can close the valve devices 28, 34 simultaneously. Alternatively, the control unit ECU can close the valve device 34 after the valve device 28, for example after a predetermined time (for example linked to the cessation dynamics of the thrust 6b) from closing of the valve device 28, in response to closing of the valve device 28.

An example of operation of the reservoir assembly 10 starting from the spacecraft 1 in the state of micro-acceleration will be described below.

FIG. 2 shows the spacecraft 1 in the state of micro-acceleration. The membrane 24 is slightly compressed by the pressurizing gas in the reservoir 21, thus maintaining a position of equilibrium in which the membrane 24 is shifted more towards the outlet port 10a with respect to the rest position shown ideally in FIG. 2 by a broken line.

The liquid propellant completely fills the capacity of the reservoir 22 or more precisely the inner volume 23 thereof.

The pressure of the pressurizing gas is partially transferred to the liquid propellant, in particular such that the liquid propellant receives a pressure equal to the difference between the pressure exerted by the pressurizing gas on the membrane 24 and the elastic reaction of the membrane 24 towards the rest position divided by its surface, in response to the pressure of the pressurizing gas.

When the propulsion apparatus 2 is activated, the control unit ECU opens the valve device 28, keeping the valve device 34 closed.

Here, the reservoir 21 receives the thrust 6b due to operation of the propulsion apparatus 2 supplied with the consequent fluid flow from the reservoir 22. In particular, the thrust 6b is caused by the gas flow 6a passing through the discharge nozzle 6.

As shown in FIG. 3, the reservoir 21 therefore has an acceleration according to the thrust 6b, so that the liquid propellant in the reservoir 21 flows towards a wall of the reservoir 21, which is opposite to the acceleration direction of the reservoir 21 and on which the orifice 21a is located.

The membrane 24 undergoes the pressure of the pressurizing gas plus a hydrostatic load as a function of the acceleration of the reservoir 22 due to the thrust 6b.

Therefore, the membrane 24 moves from the previous position of equilibrium towards the outlet port 10a.

The reservoir assembly 10 thus reaches the state of free surface formation at the expiry of the above-mentioned predetermined time interval.

Figure 4:
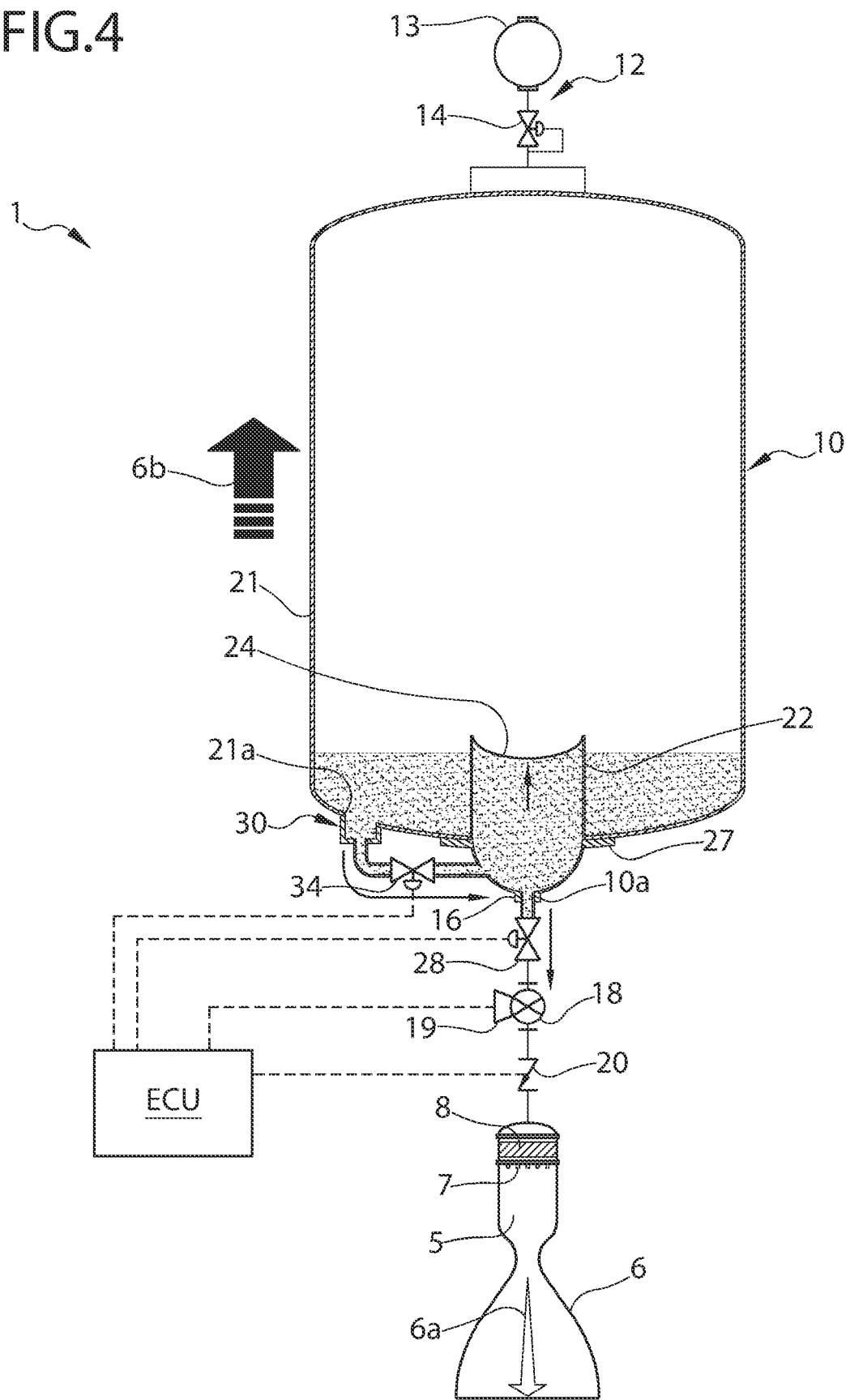
Figure 5:
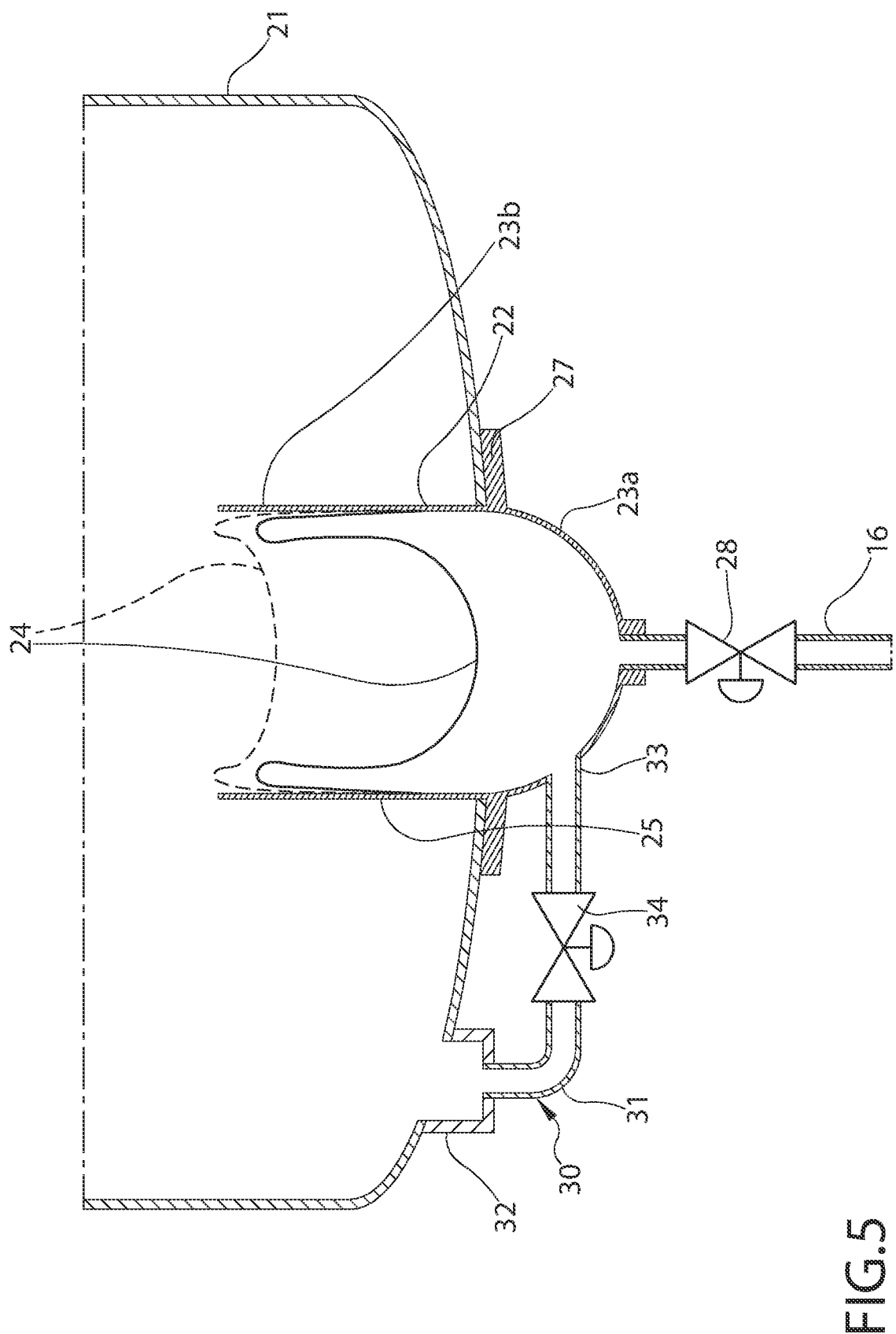
FIG. 5 is an enlargement of a portion of the reservoir assembly.

At this point, as shown in FIG. 4, the control unit ECU opens the valve device 34. Opening of the valve device 34 causes a pressure increase in the reservoir 22.

In particular, the pressure in the reservoir 22 becomes equal to the pressure of the pressurizing gas plus the hydrostatic pressure of the head of the free surface of the liquid propellant up to the point of communication between the end 33 and the reservoir 22 minus the pressure losses through the connecting means 30.

Before opening of the valve device 34, the pressure in the reservoir 22 differed due to subtraction of the pressure caused by the elastic reaction of the membrane 24, instead of by the pressure losses.

When the pressure caused by the elastic reaction of the membrane 24 is greater than the pressure losses, the pressure in the reservoir 22 increases with opening of the valve device 34.

Therefore, the membrane 34 returns towards the position of equilibrium of FIG. 2; furthermore, the liquid propellant passes from the reservoir 21 to the inner volume 23 of the reservoir 22.

In this way, the liquid propellant stored in the reservoir 22 by means of the connecting member 30 compensates for the liquid propellant supplied to the propulsion apparatus 2.

In other words, the elastic reaction of the membrane 24 allows reloading of the inner volume 23 during the presence of the thrust 6b with the valve device 34 open, thus restoring the liquid propellant used to supply the propulsion apparatus 2 when the free surface forms with the valve device 34 closed.

Upon a request for switch-off of the propulsion apparatus 2, the control unit ECU closes the valve devices 28, 34.

In particular, the control unit ECU closes the valve device 34 with a delay with respect to closing of the valve device 36. Even if the propulsion apparatus 2 is not supplied with the liquid propellant, the reservoir 21 remains accelerated, in particular during a transitory period, due to a residual thrust in the direction of the thrust 6b, where the residual thrust is due to remains of the liquid propellant in the propulsion apparatus 2.

In this phase, the liquid propellant in the reservoir 21 can continue to flow into the reservoir 22, increasing the volume thereof. In further detail, the quantity of liquid propellant entering the reservoir 22 during the transitory period is (significantly) lower than the quantity stored by the reservoir 22 when both the valve devices 34, 36 were open.

Here, the membrane 24 could overcome the position of equilibrium of FIG. 2, possibly even reaching the rest position.

From the above, the advantages of the reservoir assembly 10 according to the invention are evident.

Firstly, the reservoir 22 can be compressed thanks to the membrane 24, so it adapts its dimensions to the actual content of liquid propellant, hence the outlet port 10a is always bathed by the liquid propellant.

The components of the reservoir assembly 10 do not cause spontaneous reactions of dissociation or decomposition on the liquid propellant.

The membrane 24 can have particularly reduced dimensions, in particular with respect to the elastic bladder 102 according to the known art. This positively affects the quantity of unusable liquid propellant.

Thanks to the presence of the two reservoirs 21, 22 in parallel, there are no particular constraints on the shape of the reservoir 21, which can be designed in an arbitrarily complex manner.

Furthermore, the reservoir assembly 10 is perfectly suitable for storing low-boiling liquid propellants.

Apart from control of the valve devices 28, 34, the reservoir assembly 10 has a substantially passive function, therefore the energy consumption is minimum.

Furthermore, the reservoir assembly 10 is versatile for use in various types of missions, for example including phases of re-entry into the atmosphere and/or landing manoeuvres.

Figure 6:
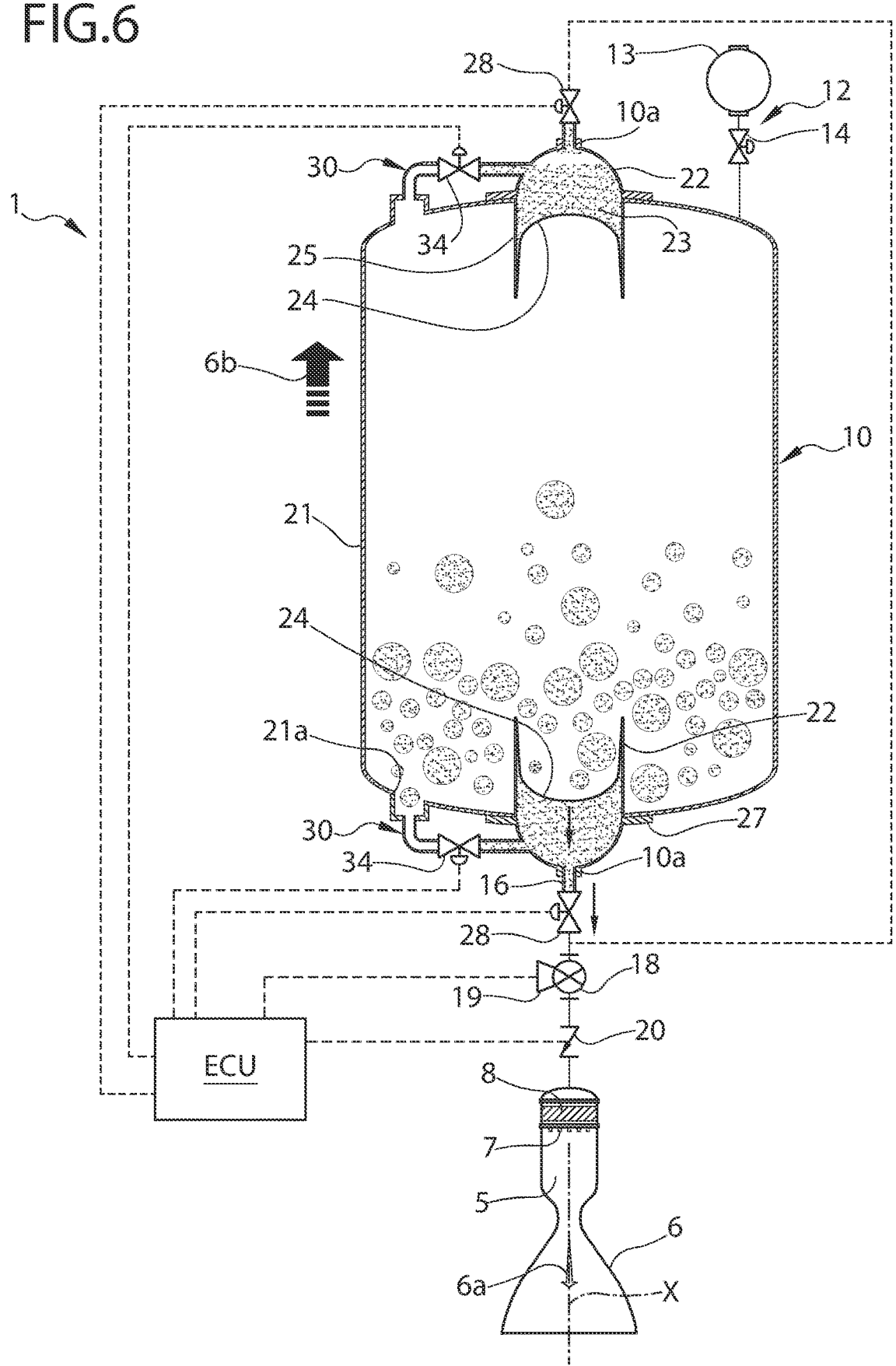
FIG. 6 is a diagram of a rocket engine with a variant of the reservoir assembly.

In this regard, according to an embodiment schematically illustrated in FIG. 6, the reservoir assembly 10 can comprise a further assembly 22 with a different location, preferably having an opposite position with respect to the previous reservoir 22, in particular according to the direction of the thrust 6b. In other words, the further reservoir 22 will be at an opposite end of the reservoir 21 with respect to where the previous reservoir 22 was located.

The further reservoir 22 will have walls 25 fixed with respect to the reservoir 21, an elastic membrane 24 arranged so as to delimit an inner volume 23 thereof from the inner volume 26, and an outlet port 10a to allow the liquid propellant to flow out towards the propulsion apparatus 2.

The further reservoir 22 can communicate with the reservoir 21 by means of a further connecting means or member 30, which can have all or some of the above-described characteristics of the previous connecting means or member 30. Also the further reservoir 22 can have all or some of the above-described characteristics of the previous one.

This solves, for example, a problem associated with the fact that the aerodynamic resistance during missions for re-entry into the atmosphere could be directed opposite to the thrust 6b and overcome in modulus the thrust 6b, so that the liquid propellant forms a free surface at the opposite side of the reservoir 21.

In this case, the further reservoir 22 and the further connecting means 30 would advantageously allow the same operation as the reservoir assembly 10 described above, despite the displacement of the free surface of the liquid propellant inside the reservoir 21.

Lastly it is clear that modifications and variations that do not depart from the protective scope defined by the claims can be made to the reservoir assembly 10 according to the invention.

For example, the propulsion apparatus 2 could be configured for attitude control of the spacecraft 1, rather than for orbital manoeuvres.

Furthermore, the geometric forms illustrated in the figures are merely examples, and they could be different.

Furthermore, it is clear that the control unit ECU carries out a control method of the reservoir assembly 10 during operation of the latter. Said control method forms part of the content of this description in an independent manner.

The invention claimed is:

1. A reservoir assembly for a rocket engine of a spacecraft, the reservoir assembly comprising
 a first reservoir defining a first inner volume,
 a second reservoir having a plurality of walls defining a second inner volume and comprising first walls of the plurality of walls fixed to the first reservoir, and an elastic membrane arranged to delimit the second inner volume from the first inner volume, thereby defining a boundary between the first and second inner volumes,
 wherein the second reservoir comprises an outlet port to allow a liquid propellant contained in the second reservoir to flow out toward a propulsion apparatus of the rocket engine,
 the reservoir assembly further comprising a connecting means coupled to the first and second reservoirs and adapted to connect the first and second reservoirs, wherein the connecting means comprises:
 a first duct having first and second opposite ends connected to the first and second reservoirs at a first orifice of the first reservoir and at a second orifice of the second reservoir, respectively, and
 a first valve device coupled to the first duct and controllable to regulate a first flow of fluid from the first reservoir to the second reservoir,
 wherein the second orifice defines an inlet port of the second reservoir separate from the outlet port.

2. A reservoir assembly for a rocket engine of a spacecraft, the reservoir assembly comprising:
- a first reservoir defining a first inner volume;
- a second reservoir having a plurality of walls defining a second inner volume and comprising first walls of the plurality of walls fixed to the first reservoir, and an elastic membrane arranged to delimit the second inner volume from the first inner volume, thereby defining a boundary between the first and second inner volumes, wherein the second reservoir comprises an outlet port to allow a liquid propellant contained in the second reservoir to flow out toward a propulsion apparatus of the rocket engine;
- a connecting means coupled to the first and second reservoirs and adapted to connect the first and second reservoirs, wherein the connecting means comprises:
  - a first duct having two opposite ends respectively connected to the first and second reservoirs, and
  - a first valve device coupled to the first duct and controllable to regulate a first flow of fluid from the first reservoir to the second reservoir;
- a second duct extending from the outlet port to convey liquid propellant from the second reservoir toward the propulsion apparatus;
- a second valve device coupled to the second duct and controllable to regulate a second flow of fluid from the second reservoir toward the propulsion apparatus; and
- a control unit configured to;
  - determine a state of free surface formation, in which a liquid propellant contained in the first reservoir collects in the first reservoir so as to form a free surface,
  - control, for the purpose of starting the propulsion apparatus, the second valve device so as to admit the second fluid flow, and
  - control the first valve device so as to prevent the first fluid flow if the state of free surface formation is not determined.

3. The reservoir assembly according to claim 2, wherein the control unit determines the free surface formation state at the expiration of a predetermined time interval from when the second valve device is controlled to admit the second fluid flow.

4. The reservoir assembly according to claim 2, wherein the control unit is configured to control the first valve device to admit the first fluid flow when the state of free surface formation is determined.

5. The reservoir assembly according to claim 4, wherein the control unit is configured to control the second valve device so as to interrupt the second fluid flow, as well as to control the first valve device so as to interrupt the first fluid flow in response to the interruption of the second fluid flow after a predetermined time from the interruption of the second fluid flow.

6. The reservoir assembly according to claim 2, wherein a second capacity of the second inner volume is less than a first capacity of the first inner volume regardless of a state of deformation of the membrane.

7. The reservoir assembly according to claim 2, wherein the plurality of walls comprises a first plurality of walls, the outlet port comprises a first outlet port, and further comprising a third reservoir having a second plurality of walls defining a third inner volume and comprising second walls of the second plurality of walls fixed with respect to the first reservoir, and an elastic membrane arranged to delimit the third inner volume from the first inner volume, thereby defining a boundary between the first and third inner volumes, wherein the third reservoir includes a second outlet port to allow a liquid propellant contained in the third reservoir to flow out toward the propulsion apparatus, and wherein the reservoir assembly further comprises an additional connecting means coupled to the first and third reservoirs and adapted to connect the first and third reservoirs, the second and third reservoirs being arranged at opposite ends of the first reservoir.

8. A spacecraft comprising a reservoir assembly according to claim 1.

9. The reservoir assembly according to claim 1, wherein a second capacity of the second inner volume is less than a first capacity of the first inner volume regardless of a state of deformation of the membrane.

10. The reservoir assembly according to claim 1, wherein the plurality of walls comprises a first plurality of walls, the outlet port comprises a first outlet port, and further comprising a third reservoir having a second plurality of walls defining a third inner volume and comprising second walls of the second plurality of walls fixed with respect to the first reservoir, and an elastic membrane arranged to delimit the third inner volume from the first inner volume, thereby defining a boundary between the first and third inner volumes, wherein the third reservoir includes a second outlet port to allow a liquid propellant contained in the third reservoir to flow out toward the propulsion apparatus, and wherein the reservoir assembly further comprises an additional connecting means coupled to the first and third reservoirs and adapted to connect the first and third reservoirs, the second and third reservoirs being arranged at opposite ends of the first reservoir.

11. A spacecraft comprising a reservoir assembly according to claim 2.

12. The reservoir assembly according to claim 2, wherein the liquid propellant contained in the first reservoir forms the free surface by means of an acceleration of the liquid propellant generated by a thrust produced by the propulsion apparatus.

* * * * *